Figure 1:
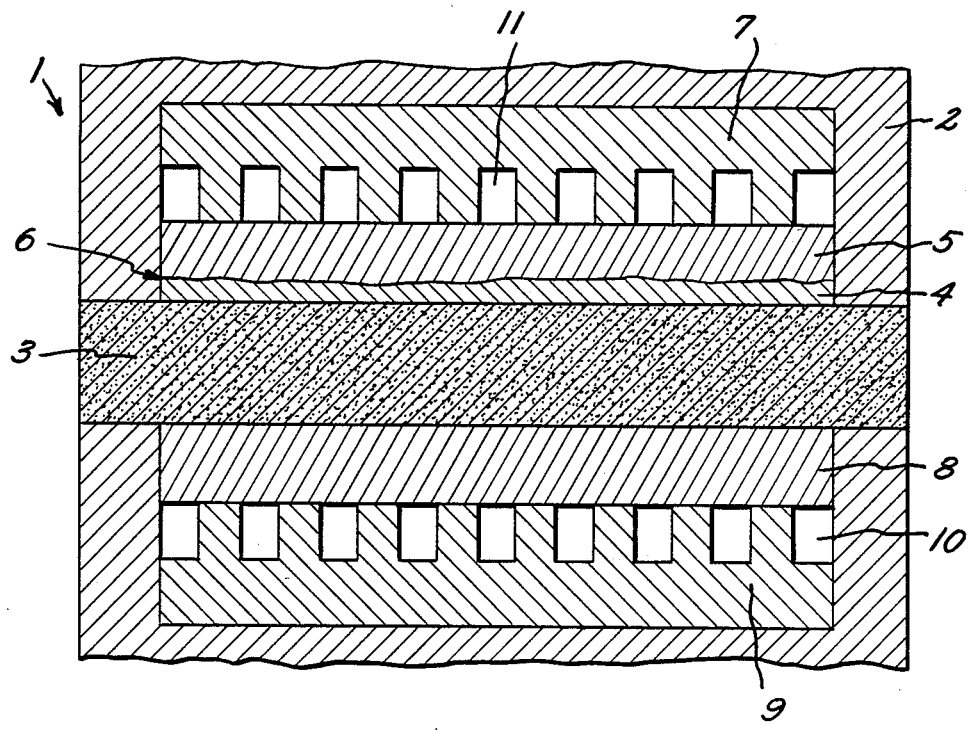

United States Patent [19]
Karas et al.

[11] Patent Number: 4,567,651
[45] Date of Patent: *Feb. 4, 1986

[54] PROCESS FOR PRODUCING A BUBBLE PRESSURE BARRIER

[75] Inventors: Bradley R. Karas, Clifton Park; Charles E. Baumgartner, Schenectady, both of N.Y.

[73] Assignee: General Electric Company, Schenectady, N.Y.

[*] Notice: The portion of the term of this patent subsequent to Feb. 19, 2002 has been disclaimed.

[21] Appl. No.: 433,315

[22] Filed: Oct. 7, 1982

[51] Int. Cl.[4] .......................................... H01R 43/00
[52] U.S. Cl. ................... 29/825; 427/126.1; 429/45
[58] Field of Search ............................ 29/825; 429/45; 174/68.5; 427/126.1, 126.2, 126.3

[56] References Cited

U.S. PATENT DOCUMENTS 4,308,299 12/1981 Arendt ........................ 429/45 X
4,386,960 6/1983 Iacovangelo et al. ........... 429/45 X
4,404,267 9/1983 Iacovangelo et al. .
4,407,908 10/1983 Appleby et al. ................ 429/45
4,423,122 12/1983 Iacovangelo et al. .

FOREIGN PATENT DOCUMENTS 710908 6/1965 Canada .................................. 429/45
728731 2/1966 Canada .................................. 429/45
804720 1/1969 Canada .................................. 429/45
813465 5/1969 Canada .................................. 429/45
1545369 11/1968 France .................................. 429/45
1592294 6/1970 France .................................. 429/45

OTHER PUBLICATIONS

Vapor Deposition, ed by Carroll F. Powell et al., Sponsored by Electrochemical Soc (1966).

Primary Examiner—Howard N. Goldberg
Assistant Examiner—Carl J. Arbes
Attorney, Agent, or Firm—Jane M. Binkowski; James C. Davis, Jr.; James Magee, Jr.

[57] ABSTRACT

A metal oxide is formed within the pores of a porous sintered blank substantially uniformly throughout the porosity of the blank producing a porous bubble pressure barrier of predetermined pore size. The barrier is integrally sintered to a face of an electrode, the median pore size of the barrier being significantly smaller than that of the electrode, producing a composite useful as an electrode in a molten carbonate fuel cell. The blank and the electrode are composed of metal.

9 Claims, 2 Drawing Figures

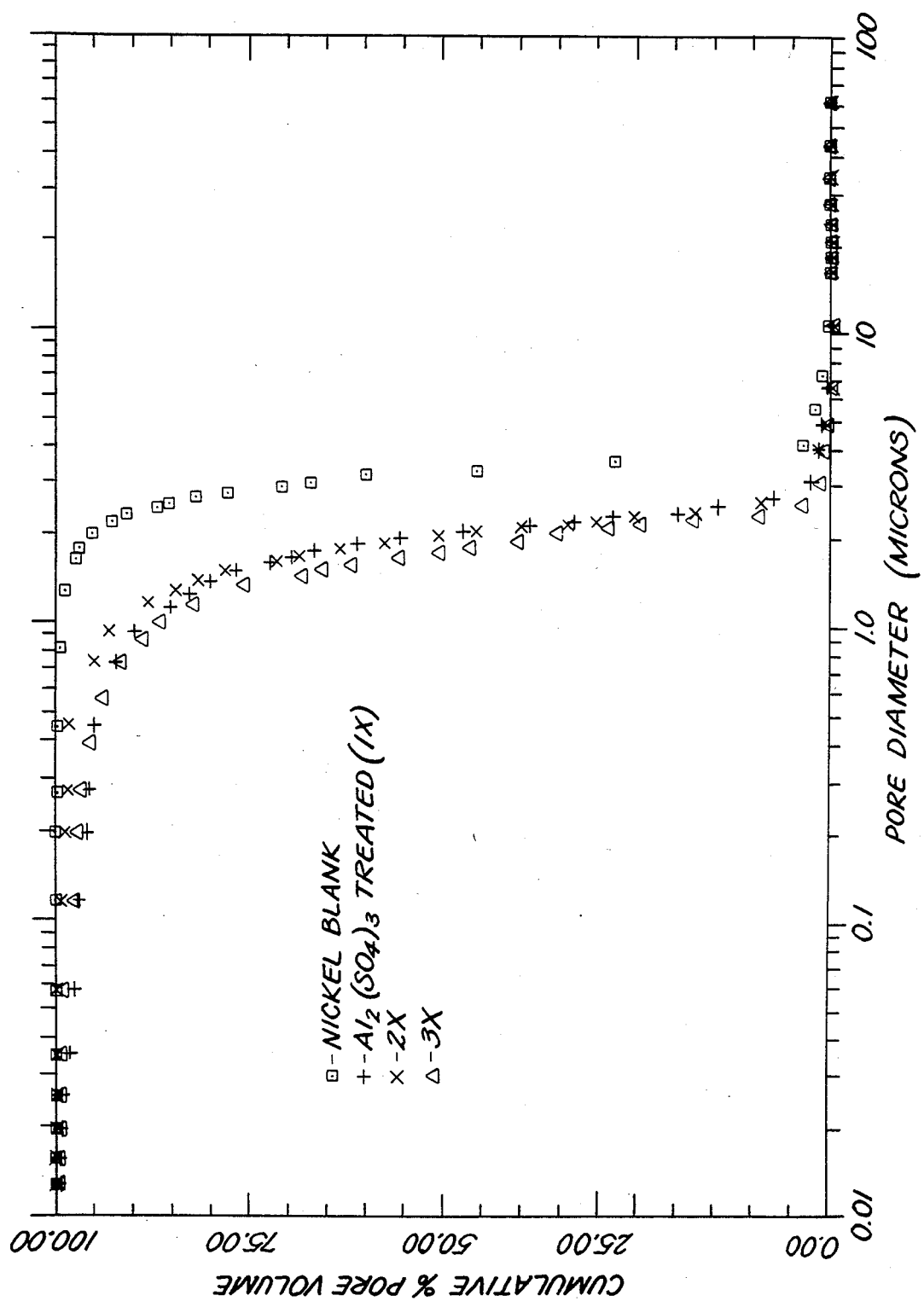

PROCESS FOR PRODUCING A BUBBLE PRESSURE BARRIER

The present invention relates to the production of a porous bubble pressure barrier useful in a molten carbonate fuel cell. The porous barrier is comprised of a porous sintered structure or blank having a deposit of metal oxide distributed within its pores substantially uniformly. The barrier is integrally sintered to one face of an anode or cathode forming a composite useful as an electrode in a molten carbonate fuel cell.

The state-of-the-art in molten carbonate fuel cell (MCFC) anodes is to use porous sintered Ni (10 wt. % Cr) electrodes. These structures are typically 60–75% porous, having average pore sizes of 4–6 microns. In an operating cell, these anodes are placed in contact with a $Li_2CO_3/K_2CO_3/LiAlO_2$ or $SrTiO_3$ composite, i.e., a composite composed of electrolyte and supporting matrix referred to in the art as a tile. The $LiAlO_2$ or $SrTiO_3$ particles form a matrix the interstices of which are filled with the carbonate melt. The average pore size in this matrix is 0.2–0.4 microns. Some of the pores in the anode during operation at 650° C. draw electrolyte ($Li_2CO_3/K_2CO_3$) from the tile providing a reaction zone for the hydrogen oxidation reaction:

$$H_2 + CO_3^= \rightarrow H_2O + CO_2 + 2e^-.$$

The gas fed to the cathode, which is on the opposite side of the tile, is a mixture of $O_2$ and $CO_2$ and some of the pores in the cathode during operation at 650° C. draw electrolyte ($Li_2CO_3/K_2CO_3$) from the tile providing a reaction zone for the oxygen reduction reaction to form carbonate via the overall reaction:

$$\tfrac{1}{2}O_2 + CO_2 + 2e^- = CO_3^=.$$

One of the pivotal problems encountered with operating cells occurs when the tile does not act as a sufficient bubble pressure barrier to the anode and cathode gases or it cracks. When this happens, the gases mix causing, as a minimum, a drop in the cell voltage and loss of electrochemically utilizable fuel, or in more severe cases, destruction of the active electrode(s), and a potential safety hazard. The present invention overcomes these problems by providing an anode or cathode which contains, as an integral part of its structure, a barrier to gas cross leakage.

In the present invention, a porous bubble pressure barrier, usually in the form of a layer or plaque, containing metal oxide within its pores, is incorporated as an integral part of the anode or cathode forming a composite. By controlling the amount of metal oxide within the pores of the barrier, a wide range of pore sizes can be achieved. Since in the presence of an insufficient amount of electrolyte to completely fill all of the pores in the electrodes and electrolyte matrix, the electrolyte fills the smallest pores, one can control the location of the electrolyte and degree of protection by controlling the size of the pores in the bubble pressure barrier. By making the pores in this barrier layer small enough to insure complete filling, the anode and cathode gases can mix only if a sufficient pressure drop exists across the cell to blow the electrolyte out of these pores. For example, if the median pore size, i.e., median pore diameter, of the pores in the barrier layer is approximately 1–3μ, it would theoretically take a ΔP of ~39 psia without flaws.

Since the pores in the barrier layer are smaller than those in the remaining electrode, they fill with electrolyte functioning as a barrier to gas cross leakage without "flooding" the remaining active electrode area, i.e., the anode or cathode. In addition to serving as a cross leak barrier, this barrier layer also ensures integral contact of the anode or cathode to the tile and may allow operation with thinner tiles thus decreasing the cell resistance and increasing the power output of the cell. Another feature of this invention is that since anodes and cathodes are already made by sintering, the addition of this barrier layer or plaque should add very little to the processing cost. Another advantage of this invention is that if portions of the barrier layer do not fill with electrolyte, or lose electrolyte with time, they will still contain the catalyst required to carry out the $H_2$ oxidation reaction or $O_2$ reduction reaction, and are, therefore, electrochemically active just like the anode or cathode.

Briefly stated, in one embodiment, the present invention is a process for producing a porous bubble pressure barrier in the form of a plaque having metal oxide distributed substantially uniformly throughout the pores and having at least one face free of any significant amount of said metal oxide which comprises providing a porous sintered blank in the form of a plaque comprised of a metal selected from the group consisting of nickel, copper, an alloy of nickel and copper, and an alloy of nickel and up to about 10 weight % chromium, said blank having a median pore size ranging from about 1 micron to about 10 microns, and a pore volume ranging from about 40% to about 75% by volume of the total volume of said blank, immersing said blank in an aqueous salt solution of a precursor for a metal oxide selected from the group consisting of aluminum oxide, titanium oxide, iron oxide, zinc oxide and cerium oxide, subjecting the aqueous salt solution to a vacuum sufficient to at least substantially evacuate the pores of said immersed blank and at least significantly filling said evacuated pores with said salt solution, retrieving the resulting filled blank, immersing said filled blank in an aqueous hydroxide solution, subjecting said aqueous hydroxide solution to a vacuum sufficient to drive it into contact with the salt solution within said pores of said blank effecting reaction therewith producing metal hydroxide, retrieving the resulting metal hydroxide-containing blank, removing the metal hydroxide from at least one face of said blank leaving no significant amount thereof, first firing the resulting metal hydroxide-containing blank to convert said metal hydroxide to oxide leaving no significant amount of said metal hydroxide therein at a temperature ranging from the temperature at which said hydroxide converts to the oxide to less than about 600° C., and second firing the resulting metal oxide-containing blank to remove any water which may be present therein at a temperature ranging from about 600° C. to about 700° C., said first and second firings being carried out at or about atmospheric pressure in a reducing atmosphere, said first and second firings having no significant deleterious effect on said bubble pressure barrier.

Also, briefly stated, in another embodiment, the present invention is a process for producing an integrally bonded electrode composite useful as an electrode in a molten carbonate fuel cell which comprises depositing a layer of an electrode-forming powder on the metal oxide-free-face of the present bubble pressure barrier, said electrode-forming powder covering said face and being coextensive therewith, said electrode-forming powder being selected from the group consisting of nickel, copper, an alloy of nickel and copper, and an alloy of nickel and up to about 10 weight % chromium, firing the resulting composite structure in a reducing atmosphere at or about atmospheric pressure, said electrode-forming powder sintering to form an electrode and simultaneously sintering to said barrier forming an integral bond therewith producing said integrally bonded electrode composite, said barrier having a median pore size significantly smaller than the median pore size of said electrode, said firing to form said electrode composite not exceeding the melting point of said composite.

Also, briefly stated, in yet another embodiment, the present invention is a process for producing an integrally bonded electrode composite useful as an electrode in a molten carbonate fuel cell which comprises providing a porous sintered electrode in the form of a plaque, said electrode being selected from the group consisting of nickel, copper, an alloy of nickel and copper, and an alloy of nickel and up to about 10 weight % chromium, contacting one face of said electrode coextensively with the metal oxide-free-face of the present bubble pressure barrier forming a composite structure, firing the resulting composite structure in a reducing atmosphere at or about atmospheric pressure sintering said barrier to said electrode forming an integral bond therewith, said bubble pressure barrier having a median pore size significantly smaller than the median pore size of said electrode, said firing to form said electrode composite not exceeding the melting point of said composite.

Those skilled in the art will gain a further and better understanding of the present invention from the detailed description set forth below, considered in conjunction with the figures accompanying and forming a part of the specification, in which:

FIG. 1 shows in cross-section the cell hardware of one type of molten carbonate fuel cell with the present anode composite; and FIG. 2 illustrates on a semilogarithmic scale the pore size distribution of each of three of the present bubble pressure components which differ only in the amount of $Al_2O_3$ content, and also, as a reference, the pore size distribution of the nickel blank used to produce each of these bubble pressure barriers.

Specifically, FIG. 1 shows cell 1 with solid metal housing 2. One face of tile 3 is in contact with bubble pressure barrier 4 integrally sintered to anode 5. Barrier 4 and anode 5 comprise the present anode composite 6. Current collector plate 7 is associated with anode 5. Plate 7 is corrugated providing openings 11 for reactant gases for the hydrogen oxidation reaction. Cathode 8 contacts the opposite face of tile 3. Current collector plate 9 is associated with cathode 8. Plate 9 is corrugated providing openings 10 for reactant gases for the oxygen reduction reaction.

In carrying out the present process, a porous sintered blank in the form of a plaque is used. Plaque herein is defined as a thin flat piece of uniform or substantially uniform thickness. The blank is comprised of a metal selected from the group consisting of nickel, copper, an alloy of nickel and copper, and an alloy of nickel and up to about 10 weight % chromium. The blank has a pore size ranging from about 0.5 micron to about 16 microns, and a median pore size ranging from about 1 micron to about 10 microns, and preferably from about 3 microns to about 7 microns. The blank has a pore volume ranging from about 40% by volume to about 75% by volume, and preferably 60% by volume to about 70% by volume, of the total volume of the blank. The particular dimensions of the blank can vary depending on the dimensions of the bubble pressure barrier desired.

The blank can be produced by a number of sintering techniques. Preferably, it is produced by depositing a uniform layer of the blank-forming metal powder on a suitable substrate such as, for example, a graphite plate. The powder is fired in a reducing atmosphere at or about atmospheric pressure at a temperature ranging from about 700° C. to about 1200° C. to sinter the powder particles together. The particular firing temperature used depends on the metal powder being sintered, and it should not exceed the melting point of the powder. For example, copper melts at 1083° C. Preferably, the firing temperature is about 750° C. and at such temperature a firing time of about 15 minutes is suitable. Preferably, the blank-forming powder is fired between plates, such as graphite plates, utilizing means on the supporting plate to maintain the desired dimensions of the layer of deposited powder. The top plate provides a minor but sufficient pressure, usually less than 1 psi, which prevents formation of voids, i.e., excessively large pores, during sintering. The pore size of the sintered blank depends largely on the size or size distribution of the starting metal powder as well as firing temperature and the longer the firing time, the greater is the degree of sintering resulting in a larger pore size.

The porous blank is immersed, preferably at room temperature, in an aqueous salt solution of a precursor for a metal oxide selected from the group consisting of aluminum oxide, titanium oxide, iron oxide, zinc oxide and cerium oxide. The particular precursor used is chosen for its solubility in water. Preferably, the precursor is a metal salt selected from the group consisting of chloride, sulfate, nitrate and acetate. The concentration of the precursor in the aqueous solution can vary, but preferably, a saturated aqueous solution of the precursor formed at or about room temperature is used.

In carrying out the present process, the blank is immersed in the precursor solution preferably within a chamber which can be evacuated. The chamber is evacuated to subject the solution preferably at or about room temperature to a vacuum sufficient to evacuate or at least substantially evacuate the pores of the immersed blank filling them or at least significantly filling them, with the solution. Ordinarily, a vacuum of about 0.001 psi to about 0.5 psi is satisfactory. The completion of the filling of the pores can be determined empirically, for example, by observing the cessation of bubbles within the precursor solution.

The resulting solution filled blank is retrieved from the precursor solution. Such retrieval can be carried out by a number of conventional techniques such as, for example, by decanting the solution.

The retrieved precursor solution-containing blank is immersed in an aqueous hydroxide solution to produce metal hydroxide within the pores of the blank preferably at or about room temperature. Representative of the aqueous hydroxide solution is ammonium hydroxide and sodium hydroxide, and preferably it is ammonium hydroxide. The molarity of the aqueous hydroxide solution can vary, for example, from about 2 to about 8, but preferably it is about 5. Preferably the blank is immersed in the aqueous hydroxide solution within a chamber which can be evacuated. The chamber is evacuated to subject the aqueous hydroxide solution to a vacuum sufficient to drive the aqueous hydroxide solution into the pores of the blank where it contacts and reacts with the precursor solution producing metal hydroxide. Ordinarily, a vacuum of about 0.001 psi to about 0.5 psi is satisfactory. Completion of the reaction of the hydroxide solution and precursor solution is determinable empirically, for example, by the cessation of bubbles within the aqueous hydroxide solution.

The resulting metal hydroxide-containing blank is retrieved from the aqueous hydroxide solution. Such retrieval can be carried out by a number of conventional techniques such as, for example, by decanting the aqueous hydroxide solution.

Ordinarily, the retrieved metal hydroxide-containing blank also has metal hydroxide sticking to its surface, i.e., the faces of the blank. Such surface metal hydroxide is removed from at least one face of the blank leaving no significant amount thereof. The surface metal hydroxide can be removed by a number of techniques such as, for example, by scraping the metal hydroxide off. Removal of the metal hydroxide from one face of the blank is necessary since subsequent firing converts the hydroxide to a strongly adherent oxide which would prevent formation of an integral bond when producing the electrode composite.

Alternately, if desired to make the pores smaller, the retrieved metal hydroxide-containing blank can be recycled, i.e., subjected to the same treatment or cycled as the metal blank alone was to increase the amount of metal hydroxide within the pores of the blank.

The resulting blank containing metal hydroxide within its pores is fired to convert the metal hydroxide to the metal oxide leaving no significant amount of hydroxide therein. This initial or first firing is carried out at a temperature ranging from the temperature at which the metal hydroxide converts to the oxide to less than about 600° C., and preferably up to about 550° C. A first firing temperature of about 600° C. or higher is not useful since it significantly increases the probability of entrapping water within the metal oxide formed, and also it produces larger sized metal oxide particles which decrease the pressure capacity of the pores. The completion of the first firing can be determined empirically, for example, by thermogravimetric analysis, i.e., when the sample stops losing weight. If it is desired to make the pores smaller, the metal oxide-containing blank can be recycled, i.e., it can be subjected to the same present treatment or cycled as the metal blank alone was, to increase the amount of metal oxide within the pores of the blank.

The resulting blank containing metal oxide within its pores is then fired to remove any water which may be present therein producing the present bubble pressure barrier. This subsequent or second firing is carried out at a temperature ranging from about 600° C. to about 700° C. A temperature lower than 600° C. would be insufficient to insure removal of entrapped water, whereas a temperature higher than about 700° C. provides no significant advantage. Completion of the second firing is determinable empirically, for example, by thermogravimetric analysis.

If it is desired to make the pores of the barrier smaller, the barrier can be recycled, i.e., it can be subjected to the same present treatment or cycled as the metal blank alone was, to increase the amount of metal oxide within the pores of the barrier.

The first and second firings are carried out at or about atmospheric pressure in a reducing atmosphere. Representative of the reducing atmosphere is a mixture of hydrogen and a noble gas, preferably about 10% by volume hydrogen balance argon. Preferably, both firings are carried out in the same reducing atmosphere as a continuous procedure. All of the present firings should have no significant deleterious effect on the resulting oxide containing blank, i.e., the bubble pressure barrier.

The bubble pressure barrier has pores distributed throughout its structure. The size of the pores in the barrier is critical. The barrier must have a median pore size significantly smaller than the median pore size of the electrode with which it forms the present electrode composite. Specifically, the pores of the barrier must be sufficiently small so that they are filled, i.e., flooded with electrolyte in order that electrolyte be maintained in the barrier. Generally, the median pore size or pore diameter in the bubble pressure barrier ranges from about $0.2\mu$ to about $2\mu$, and typically, it ranges from about $0.5\mu$ to about $1.5\mu$. Preferably, the median pore size of the barrier is larger than the median pore size of the matrix supporting the carbonate electrolyte.

The bubble pressure barrier has a pore volume less than about 40% by volume to less than about 75% by volume and generally about 35% by volume to about 70% by volume of the total volume of the barrier. The specific pore volume and pore size or pore size distribution is determinable empirically.

The present bubble pressure barrier can be as thin as desired. Generally, as a practical matter, the barrier has a minimum thickness of about 0.001 inch. Also, it can be as thick as desired, for example, as thick as about 0.030 inch. Typically, the thickness of the barrier ranges from about 0.005 inch to about 0.010 inch.

The present electrode composite is produced by making the bubble pressure barrier an integral part of an electrode which is useful as an electrode in a molten carbonate fuel cell. The composition and structure of the barrier does not differ significantly from that of the barrier integrally sintered to an electrode forming the present electrode composite. The electrode can be an anode or a cathode. The anode is composed of a metal selected from the group consisting of nickel, copper, an alloy of nickel and copper and an alloy of nickel and up to about 10 weight % chromium. The cathode is composed of a metal selected from the group consisting of nickel, copper and an alloy of nickel and copper. An alloy of nickel and chromium is not useful in forming the present cathode composite.

In one embodiment of the present invention, the electrode composite is produced by providing the porous sintered electrode in the form of a plaque, contacting one face of the electrode coextensively with a face of the barrier forming a composite therewith, and firing the resulting composite structure integrally bonding the barrier and electrode producing the present electrode composite. A state-of-the-art anode or cathode can be used if desired.

Preferably, however, the present electrode composite is produced by depositing a uniform layer of electrode-forming powder on the metal oxide-free-face of the barrier covering the barrier face completely and firing the resulting composite structure forming a porous sintered electrode in position and simultaneously integrally bonding the barrier to the electrode. Preferably, the composite structure is fired between graphite plates with the top plate providing a minor but sufficient pressure, usually less than 1 psi, to prevent formation of voids, i.e., excessively large pores, during sintering.

To produce the present electrode composite, the composite structure is fired in a reducing atmosphere at or about atmospheric pressure at a temperature ranging from about 700° C. to about 1100° C., and preferably at about 1000° C. The particular firing temperature used depends on the material being fired, and it should not exceed the melting point of the composite. A firing temperature below about 700° C. will not produce the present integrally bonded electrode composite, whereas a temperature above about 1100° C. provides no significant advantage. Generally, firing time ranges from about 15 minutes to about 3 1 hours.

In the present invention, all of the firing or sintering should have no significant deleterious effect on the product being produced. Also, the reducing atmosphere used in the present firing or sintering preferably is comprised of about 10% by volume hydrogen balance argon.

The present electrode composite is useful as an electrode, i.e., as an anode or cathode, in a molten carbonate fuel cell. It is in the form of a plaque, i.e., a piece of uniform or substantially uniform thickness with a pair or flat faces, and it has pores distributed throughout its structure. Specifically, it is comprised of a porous sintered electrode which is in the form of a plaque, and a porous sintered bubble pressure barrier, which also is in the form of a plaque. In order for the present electrode composite to function satisfactorily, the bubble pressure barrier is integrally sintered to one face of the electrode and covers that electrode face entirely, i.e., it is coextensive therewith.

The present electrode composite has a pore volume ranging from higher than about 40% by volume to less than about 75% by volume, and preferably about 55% by volume, of the total volume of the composite. In the present electrode composite, the active electrode, i.e., anode or cathode, has a total pore volume, i.e., porosity, ranging from higher than about 40% by volume to less than about 75% by volume, and preferably about 60% by volume, of the total volume of the electrode. Also, in the present electrode composite, the pressure barrier has a total pore volume ranging from less than about 40% by volume to less than about 75% by volume, and preferably about 50% by volume, of the total volume of the pressure barrier. A composite pore volume of about 55% is preferred since such porosity provides the integrally bonded electrode composite with good surface area for electrochemical reactions and allows it to have good density necessary for strength.

The specific pore volume and pore size or pore size distribution of the present electrode composite is determinable empirically. Specifically, the pore volume and pore size or size distribution of the electrode component depends largely on the porosity of the matrix supporting the carbonate electrolyte as well as the operating conditions of the cell. For best results, the electrode component of the composite should have a pore volume and pore size distribution which allow enough electrolyte to enter it to accomplish reaction but not so much as to "flood" it to the point where the reacting gas cannot diffuse rapidly to the reaction sites. Small pores in the electrode or matrix retain electrolyte in preference to large pores. In order for the electrode to perform well, it must take up enough electrolyte to allow the cell reaction; yet, it must not take up so much electrolyte that the gas cannot diffuse rapidly to and from the reaction sites. Preferably, therefore, the electrode should have some percentage of pores which are smaller than pores in the matrix for the electrode to retain electrolyte and a larger percentage of pores which are greater in size than pores in the matrix so as to remain dry. Generally, the median pore size of the electrode component of the electrode composite ranges from in excess of one micron to about 10 microns. Generally, the cathode has a median pore size which ranges from about 3 microns to about 5 microns and the anode has a median pore size ranging from about $4\mu$ to about $6\mu$. Also, generally, the pores in the electrode portion of the composite range in size from about 0.1 micron to about 20 microns, and frequently they range from about 2 microns to about 10 microns. Preferably, the electrode component of the composite which is a cathode ranges in thickness from about 0.01 inch to about 0.1 inch. Also, preferably, the electrode component of the present composite which is an anode ranges in thickness from about 0.004 inch to about 0.060 inch.

The present electrode composite is electrochemically active for the reactions of the molten carbonate fuel cell, and it is useful as an electrode in a molten carbonate fuel cell.

The invention is further illustrated by the following examples:

EXAMPLE 1

Commercially available nickel 123 powder ranging in size from about $2\mu$ to about $3\mu$ was used to form the sintered blank.

To produce the porous sintered blank, Grafoil ® sheet was positioned on the surface of a graphite plate to produce a cavity 5.25" square and 0.025" deep. The nickel powder was deposited and doctor bladed into the cavity filling it producing a smooth layer about 0.025" thick. Grafoil ® (0.050" thick) sheet was placed on top of the deposited layer of powder and covered it substantially completely. A 6" square graphite plate was placed on top of the Grafoil ® covering it completely and pressure was applied to press the powder at room temperature under about 1000 psi. The applied pressure was then removed. A 2.5 kg steel plate was placed on top of the top graphite plate so that the body of nickel powder would shrink substantially only in thickness during sintering, and the resulting structure was then fired in an atmosphere comprised of 10% by volume hydrogen balance argon to a sintering temperature of 750° C. After 15 minutes at 750° C., the power was shut off and the blank was furnace cooled to room temperature.

The resulting porous sintered blank had pores distributed throughout its structure which was substantially uniform. It was in the form of a plaque 17.5 mils thick, and was uniform in thickness.

The blank was cut into four pieces, each approximately 1.5" square. One of the pieces was used as a reference and it is shown as Experiment 1 in Table I. In Experiments 2-4, each of the remaining three pieces was treated in accordance with the present invention to produce a bubble pressure barrier of differing pore size and porosity.

Specifically, in Experiment 2, an aqueous saturated solution of $Al_2(SO_4)_3$ was formed at room temperature and placed within a vacuum chamber. One of the blank pieces was immersed in the solution at room temperature which was then subjected to the house vacuum which was about ½ psi. When cessation of bubbles within the solution was observed, which indicated filling of the pores in the blank, the vacuum was broken, the solution was decanted and the resulting solution-filled blank was retrieved.

An aqueous solution of ammonium hydroxide having a molarity of about 5 was prepared at room temperature and placed within a vacuum chamber. The sulfate solution filled blank was immersed in the hydroxide solution at room temperature which was then subjected to the house vacuum. When cessation of bubbles within the solution was noted, which indicated completion of reaction of the ammonium hydroxide with the aluminum sulfate within the pores of the blank producing aluminum hydroxide therein, the vacuum was broken, the hydroxide solution was decanted, the aluminum hydroxide-containing blank was retrieved, and the aluminum hydroxide was scraped off the faces of the blank. The resulting aluminum hydroxide-containing blank was used in Experiment 2 of Table I.

In Experiment 3 of Table I, another one of the nickel blank pieces was used and the run, i.e., treatment, set forth for Experiment 2 was repeated two times. Specifically, in Experiment 3, when the first run was completed, the scraped aluminum hydroxide containing blank was dried in a vacuum oven at 160° C. for about 30 minutes, and then run again through the sulfate and hydroxide solutions to produce the aluminum hydroxide containing blank.

In Experiment 4, another one of the nickel blank pieces was used and the run set forth for Experiment 2 was repeated three times. Specifically, in Experiment 4, the initially produced scraped aluminum hydroxide containing blank was dried as in Experiment 3, run again as in Experiment 2 and dried as in Experiment 3 and then run a third time as in Experiment 2.

The resulting hydroxide containing blanks, i.e., samples, of Experiments 2–4 of Table I were fired at the same time in an atmosphere comprised of 10% by volume hydrogen balance argon initially at a firing temperature of 450° C. for 3 hours, then the temperature was raised to 650° C. where it was held for 10 hours and then furnace cooled to room temperature.

In Table I, the reference nickel blank and the fired products of Experiments 2 to 4 were analyzed by mercury intrusion porosimetry for porosity and pore size. The results are given in Table I and FIG. 2 is a plot of the pore size distribution.

cell. Specifically, FIG. 2 shows the effect of aluminum oxide incorporation on the pore size of the sintered porous blank.

A comparison of the densities of the products of Table I shows that the lower the density of the product, the larger is the amount of aluminum oxide present in the barrier. Also, the void volume filled with $Al_2O_3$ in Table I further exemplifies the fact that with increasing treatment in accordance with the present invention, increasing amounts of aluminum oxide are deposited in the barrier.

EXAMPLE 2

This is a paper example.

One of the bubble pressure barriers produced in Experiments 2, 3 or 4 of Example 1 could be supported on a graphite plate, and a layer of nickel with 10 weight % chromium powder ranging in size from about 2 microns to about 4 microns could be doctor bladed as set forth in Example 1 on the exposed face of the barrier to a thickness of about 40 mils covering the face of the barrier completely.

The resulting composite structure could be placed between graphite plates and fired as set forth in Example 1 in 10% by volume $H_2$ balance argon at a firing temperature of about 1000° C. for about one hour to sinter the powder together forming an electrode and simultaneously to sinter the barrier to the electrode. The resulting integrally bonded electrode composite would be useful as an anode in a molten carbonate fuel cell.

The following copending applications are assigned to the assignee hereof and are incorporated herein by reference:

Ser. No. 433,314 filed on even date herewith for B. R. Karas and C. E. Baumgartner, entitled Bubble Pressure Barrier and Electrode Composite, discloses that utilizing an organometallic precursor a metal oxide is formed within the pores of a porous sintered blank substantially uniformly throughout the porosity of the blank producing a porous bubble pressure barrier of predetermined pore size, that the barrier is integrally sintered to a face of an electrode, the median pore size of the barrier being significantly smaller than that of the electrode, producing a composite useful as an electrode in a molten carbonate fuel cell, and that the blank and the electrode are composed of metal.

Ser. No. 416,448 filed about Sept. 7, 1982 for C. D. Iacovangelo entitled Cathode Composite for Molten

TABLE I

| Experiment No. | Sample | Fired Product | | | |
| --- | --- | --- | --- | --- | --- |
| | | Porosity % by vol | Median pore size (μ) | Density (g/cc) | Void volume filled with $Al_2O_3$ (%) |
| 1 | Ni blank alone (reference) | 61.7 | 3.26 | 8.90 | 0 |
| 2 | Al(OH)$_3$ containing Ni blank filled 1X | 58.3 | 2.04 | 8.81 | 1.20 |
| 3 | Al(OH)$_3$ containing Ni blank filled 2X | 57.7 | 1.98 | 8.80 | 1.30 |
| 4 | Al(OH)$_3$ containing Ni blank filled 3X | 51.4 | 1.78 | 8.79 | 1.45 |

Experiments 2, 3 and 4 of Table I illustrate the present invention. Specifically, Experiments 2, 3 and 4 show that the porosity of the barrier and median pore size can be varied in accordance with the present process to produce a bubble pressure barrier suitable for forming an electrode composite useful in a molten carbonate fuel Carbonate Fuel Cell now U.S. Pat. No. 4,448,851 issued May 15, 1984 discloses a cathode composite useful for a molten carbonate fuel cell comprised of a porous sintered cathode having a porous sintered bubble pressure barrier integrally sintered to one face thereof, said cathode composite having a porosity ranging from about 25% by volume to about 75% by volume of the total volume of said composite, said cathode having a porosity ranging from about 25% by volume to about 75% by volume of the total volume of said cathode, said pressure barrier having a porosity ranging from about 25% by volume to about 75% by volume of the total volume of said barrier, said cathode having a median pore size ranging from in excess of one micron to about 10 microns, said barrier having a median pore size significantly smaller than that of said cathode, said cathode and said pressure barrier being comprised of from about 10 weight % to about 90 weight % $Li_xNi_{(1-x)}O$/balance $Li_yCu_{(1-y)}O$, where x and y each ranges from about 0.005 to about 0.25.

Ser. No. 371,879 filed Apr. 26, 1982 for C. D. Iacovangelo and K. P. Zarnoch entitled Anode Composite for Molten Carbonate Fuel Cell discloses an anode composite useful for a molten carbonate fuel cell comprised of a porous sintered metallic anode component having a porous bubble pressure barrier integrally sintered to one face thereof, said barrier being comprised of metal coated ceramic particles sintered together and to said anode by means of said metal coating, said metal coating enveloping said ceramic particle and being selected from the group consisting of nickel, copper and alloys thereof, the median pore size of the barrier being significantly smaller than that of the anode.

What is claimed is:

1. A process for producing a porous bubble pressure barrier of predetermined pore size by forming metal oxide within its pores, said bubble pressure barrier having at least one face free of any significant amount of said metal oxide, said bubble pressure barrier being useful in a molten carbonate fuel cell, which consists essentially of providing a porous sintered blank in the form of a plaque consisting essentially of a metal selected from the group consisting of nickel, copper, an alloy of nickel and copper, and an alloy of nickel and up to about 10 weight % chromium, said blank having a median pore size ranging from about 1 micron to about 10 microns, and a pore volume ranging from about 40% to about 75% by volume of the total volume of said blank, immersing said blank in an aqueous salt solution of a precursor for a metal oxide selected from the group consisting of aluminum oxide, titanium oxide, iron oxide, zinc oxide and cerium oxide, subjecting the aqueous salt solution to a vacuum sufficient to at least substantially evacuate the pores of said immersed blank and at least significantly fill said evacuated pores with said salt solution, retrieving the resulting filled blank, immersing said filled blank in an aqueous hydroxide solution, subjecting said aqueous hydroxide solution to a vacuum sufficient to drive it into contact with the salt solution within said pores of said blank effecting reaction therewith producing metal hydroxide, retrieving the resulting metal hydroxide-containing blank, removing the metal hydroxide from at least one face of said blank leaving no significant amount thereof, first firing the resulting metal hydroxide-containing blank to convert said metal hydroxide to metal oxide leaving no significant amount of said hydroxide therein at a temperature ranging from the temperature at which said hydroxide converts to the oxide to less than about 600° C., and second firing the resulting metal oxide-containing blank to remove any water which may be present therein at a temperature ranging from about 600° C. to about 700° C., said first and second firings being carried out at or about atmospheric pressure in a reducing atmosphere, said first and second firings having no significant deleterious effect on said bubble pressure barrier.

2. The process according to claim 1 wherein said metal oxide is aluminum oxide.

3. The process according to claim 1 wherein said aqueous hydroxide solution is aqueous ammonium hydroxide.

4. A process for producing an integrally bonded electrode composite useful as an electrode in a molten carbonate fuel cell which consists essentially of the following steps:

(a) producing a porous bubble pressure barrier of predetermined pore size by forming metal oxide within its pores, said bubble pressure barrier having at least one face free of any significant amount of said metal oxide, which consists essentially of providing a porous sintered blank in the form of a plaque consisting essentially of a metal selected from the group consisting of nickel, copper, an alloy of nickel and copper, and an alloy of nickel and up to about 10 weight % chromium, said blank having a median pore size ranging from about 1 micron to about 10 microns, and a pore volume ranging from about 40% to about 75% by volume of the total volume of said blank, immersing said blank in an aqueous salt solution of a precursor for a metal oxide selected from the group consisting of aluminum oxide, titanium oxide, iron oxide, zinc oxide and cerium oxide, subjecting the aqueous salt solution to a vacuum sufficient to at least substantially evacuate the pores of said blank and at least significantly fill said evacuated pores with said salt solution, retrieving the resulting filled blank, immersing said filled blank in an aqueous hydroxide solution, subjecting said aqueous hydroxide solution to a vacuum sufficient to drive it into contact with the salt solution within said pores of said blank effecting reaction therewith producing metal hydroxide, retrieving the resulting metal hydroxide-containing blank, removing the metal hydroxide from at least one face of said blank leaving no significant amount thereof, first firing the resulting metal hydroxide-containing blank to convert said metal hydroxide to metal oxide leaving no significant amount of said hydroxide therein at a temperature ranging from the temperature at which said hydroxide converts to the oxide to less than about 600° C., and second firing the resulting metal oxide-containing blank to remove any water which may be present therein at a temperature ranging from about 600° C. to about 700° C., said first and second firings being carried out at or about atmospheric pressure in a reducing atmosphere, said first and second firings having no significant deleterious effect on said bubble pressure barrier; and (b) depositing a layer of an electrode-forming powder on said metal oxide-free-face of said bubble pressure barrier, said electrode-forming powder covering said face and being coextensive therewith, said electrode-forming powder being selected from the group consisting of nickel, copper, an alloy of nickel and copper, and an alloy of nickel and up to about 10 weight % chromium, firing the resulting composite structure in a reducing atmosphere at or about atmospheric pressure, said electrode-forming powder sintering to form an electrode and simultaneously sintering to said barrier forming an integral bond therewith producing said integrally bonded electrode composite, said barrier having a median pore size significantly smaller than the median pore size of said electrode, said firing to form said electrode composite not exceeding the melting point of said composite.

5. The process according to claim 4 wherein said electrode composite is an anode composite.

6. The process according to claim 4 wherein said electrode composite is a cathode composite selected from the group consisting of nickel, copper and an alloy of nickel and copper.

7. A process for producing an integrally bonded electrode composite useful as an electrode in a molten carbonate fuel cell which consists essentially of the following steps:

(a) producing a porous bubble pressure barrier of predetermined pore size by forming metal oxide within its pores, said bubble pressure barrier having at least one face free of any significant amount of said metal oxide, which consists essentially of providing a porous sintered blank in the form of a plaque consisting essentially of a metal selected from the group consisting of nickel, copper, an alloy of nickel and copper, and an alloy of nickel and up to about 10 weight % chromium, said blank having a median pore size ranging from about 1 micron to about 10 microns, and a pore volume ranging from about 40% to about 75% by volume of the total volume of said blank, immersing said blank in an aqueous salt solution of a precursor for a metal oxide selected from the group consisting of aluminum oxide, titanium oxide, iron oxide, zinc oxide and cerium oxide, subjecting the aqueous salt solution to a vacuum sufficient to at least substantially evacuate the pores of said immersed blank and at least significantly fill said evacuated pores with said salt solution, retrieving the resulting filled blank, immersing said filled blank in an aqueous hydroxide solution, subjecting said aqueous hydroxide solution to a vacuum sufficient to drive it into contact with the salt solution within said pores of said blank effecting reaction therewith producing metal hydroxide, retrieving the resulting metal hydroxide-containing blank, removing the metal hydroxide from at least one face of said blank leaving no significant amount thereof, first firing the resulting metal hydroxide-containing blank to convert said metal hydroxide to metal oxide leaving no significant amount of said hydroxide therein at a temperature ranging from the temperature at which said hydroxide converts to the oxide to less than about 600° C., and second firing the resulting metal oxide-containing blank to remove any water which may be present therein at a temperature ranging from about 600° C. to about 700° C., said first and second firings being carried out at or about atmospheric pressure in a reducing atmosphere, said first and second firings having no significant deleterious effect on said bubble pressure barrier; and (b) providing a porous sintered electrode in the form of a plaque, said electrode being selected from the group consisting of nickel, copper, an alloy of nickel and copper, and an alloy of nickel and up to about 10 weight % chromium, contacting one face of said electrode coextensively with said metal oxide-free-face of said bubble pressure barrier forming a composite structure, firing the resulting composite structure in a reducing atmosphere at or about atmospheric pressure sintering said barrier to said electrode forming an integral bond therewith, said bubble pressure barrier having a median pore size significantly smaller than the median pore size of said electrode, said firing to form said electrode composite not exceeding the melting point of said composite.

8. The process according to claim 7 wherein said electrode composite is an anode composite.

9. The process according to claim 7 wherein said electrode composite is a cathode composite selected from the group consisting of nickel, copper and an alloy of nickel and copper.

* * * * *